Jan. 5, 1954
C. H. LEONARD ET AL
2,664,930
FORMING CUTTER FOR ROUNDING HANDLE ENDS
Filed July 23, 1951
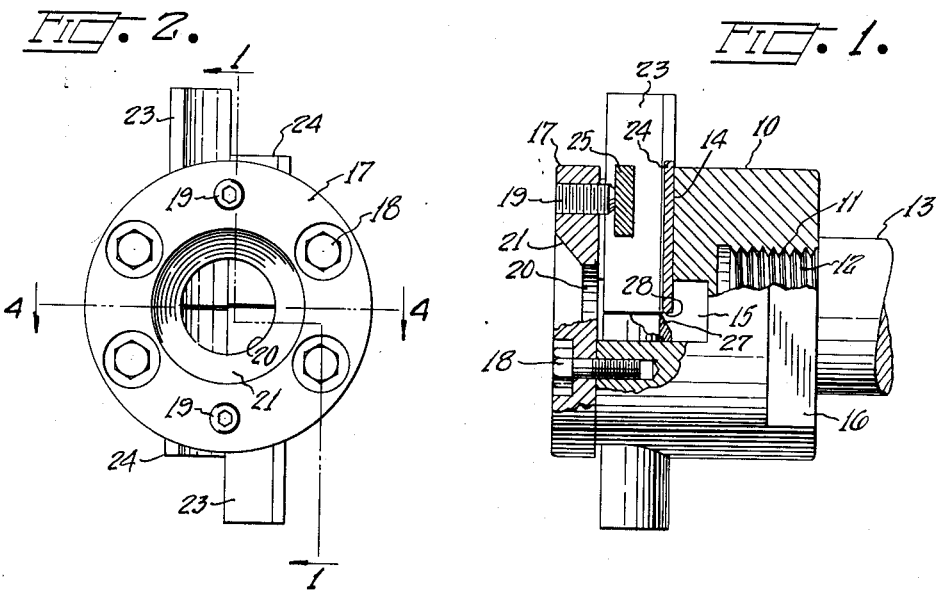
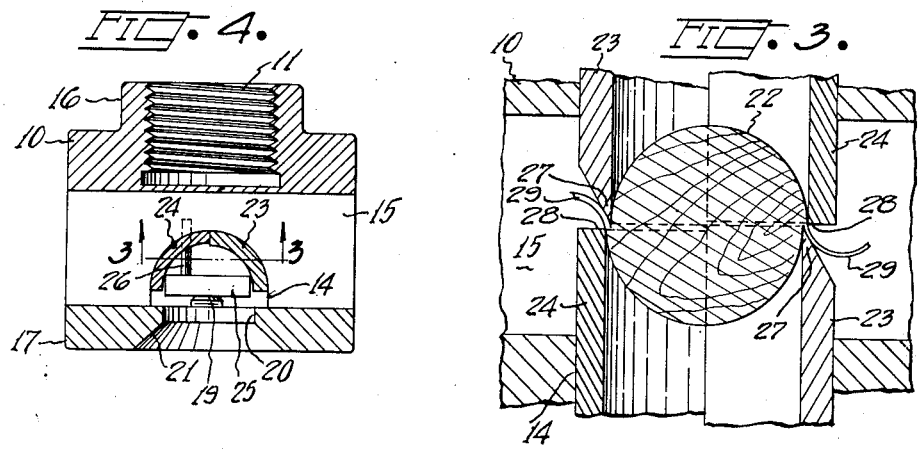
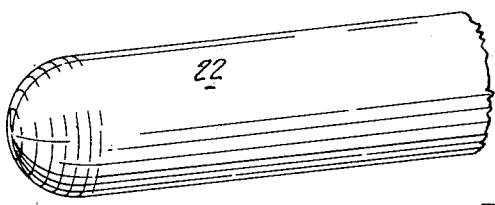
INVENTORS
CHARLES H. LEONARD
JOSEPH M. COOKE
BY
ATTORNEY Patented Jan. 5, 1954

2,664,930

UNITED STATES PATENT OFFICE 2,664,930

FORMING CUTTER FOR ROUNDING HANDLE ENDS

Charles H. Leonard and Joseph M. Cooke, Silverton, Oreg.; said Cooke assignor to said Leonard Application July 23, 1951, Serial No. 238,062

3 Claims. (Cl. 144—218)

This invention relates generally to the manufacture of wooden handles and particularly to a forming cutter for rounding handle ends.

The main object of this invention is to economically produce on the end of a wooden handle a smooth rounded end without vibration or chattering, thereby producing a smooth surface on the end grain of the wood.

We accomplish this and other objects in the manner set forth in the following specifications as illustrated in the accompanying drawing, in which Fig. 1 is a broken section taken along the line 1—1 in Fig. 2.

Fig. 2 is an end elevation of Fig. 1.

Fig. 3 is a fragmentary section taken along the line 3—3 in Fig. 4 at an enlarged scale.

Fig. 4 is a section taken along the line 4—4 in Fig. 2.

Fig. 5 shows a rounded handle end.

Like numbers of reference refer to the same or similar parts throughout the several views.

Referring in detail to the drawing, there is shown a cylindrical body 10 having a threaded opening 11 in which is the threaded end 12 of the spindle 13 which is either fixed or rotatable, depending upon the class of machine on which it is used.

Diametrically across the body 10 is formed a semi-cylindrical channel 14 and intersecting the channel 14 is a rectangular slot 15 for the discharge of shavings.

It is desirable to provide the body 10 with the parallel faces 16 for the application of a wrench.

Over the face of the body 10 is placed a cover plate 17 which is held in place by the four cap screws 18. Within the plate 17 are the two set screws 19 which are in alignment with the channel 14. In the center of the plate 17 is formed the cylindrical opening 20 having the countersunk edge 21. The diameter of the opening 20 is sufficient to receive the handle end 22.

Mounted in each of the opposite ends of the channel 14 are the arcuate blade 23 and the arcuate shoe 24. The members 23 and 24 unite to form a semi-circular trough which occupies the channel 14. In each end portion of the trough lies a straight pressure bar 25 which engages the blade and shoe and is in turn engaged by the set screw 19. Each bar 25 is held against lateral movement by the pin 26 which extends loosely into the plate 25 and loosely through the arcuate shoe 24 into the body 10.

Each blade 23 is thicker than its opposing shoe 24 in order to permit the cutting edge 27 to protrude inwardly or above the concave surface of the shoe 24 opposing said cutting edge.

It will be noted that from the position of the screws 19 in Fig. 2 that the pressure bars 25 are clear of the rectangular slot 15 and will not obstruct the flow of chips into the slot 15.

It will be noted that the leading edge 27 of each arcuate blade 23 is chisel-shaped and is given a slight lead or feed against the adjacent edge 28 of the shoe 24 directly in alignment therewith.

It will be observed that the blade 23 can slide longitudinally when the setscrew 19 is released for the purpose of sharpening or resetting the cutter. The shoes 24 are held against longitudinal movement by the pins 26.

It will also be noted that, as the chips 29 are turned from the end of the handle 22, they pass into the rectangular slots 15 and are driven centrifugally out of the cutter.

The purpose of the rounded shoes 24 is to form a stop for the laterally adjacent or companion blade 23 and to form a fulcrum for the pressure plate 25, as well as to form a breaking edge for the longitudinally adjacent cutting edge 27.

The fineness of the cut is determined by the gap between the cutting edge 27 and the adjacent edge 28.

Each pressure plate 25 engages one pair of members 23 and 24 and the screw 19, which engages the plate 25, forces both the members 23 and 24 into engagement with the interior of the channel 15.

We claim:

1. A forming cutter for rounding handle ends comprising a cylindrical body adapted to be mounted on a driving spindle, said body having a rectangular slot across the diameter of one face thereof, said body having a semi-cylindrical channel formed in the same face normally intersecting said square slot at the middle of its length, a cover plate secured to said body and having a work-receiving opening therein, each end of said semi-cylindrical channel having disposed therein side by side an arcuate cutting blade and an arcuate shoe, the cutting edge of the blade located in one end of the channel opposing the end of the shoe located in the other end of the channel substantially under the opening in the cover plate, the shoe being thinner than the blade, a pressure bar in the outer end of each pair of shoes and blades and set screws in said cover plate bearing against said pressure bar.

2. A forming cutter for rounding handle ends comprising a cylindrical body adapted to be mounted on a driving spindle, said body having a rectangular slot across the diameter of one end of said body and a semi-cylindrical channel formed across the diameter of said body normally intersecting said rectangular slot, a cover plate secured across the slotted end of said body and having a work-receiving opening therein, each end of said semi-cylindrical channel having an arcuate cutting blade and a thinner arcuate shoe mounted therein, the side edges of which contact at the bottom of said semi-cylindrical channel, the cutting edge of the blade located in one end of the channel opposing the end of the shoe located in the other end of the channel substantially under the opening in the cover plate, each pair of contacting shoes and blades having a straight pressure bar disposed against their concave sides and set screws in opposite sides of said cover plate engaging said pressure bars.

3. A forming cutter for rounding handle ends comprising a cylindrical body adapted to be mounted on a driving spindle, said body having a pair of normally intersecting slots across the free end thereof, one of said slots having a semi-cylindrical bottom and having mounted on each end of said semi-cylindrical bottom an arcuate blade having a chisel-shaped innermost end and a thinner arcuate shoe adjacent to said blade and having one end of said shoe set back of the cutting edge of said chisel-shaped blade, the chisel-shaped end of the blade in one end of the slot opposing the end of the shoe in the other end of the slot substantially centrally thereof, a straight pressure bar engaging the outermost portions of the blade and shoe, a dowel pin passing freely through said bar and shoe and into said body and a cover plate secured to said slotted head end having set screws adapted to engage said pressure bars.

CHARLES H. LEONARD.
JOSEPH M. COOKE.

References Cited in the file of this patent

UNITED STATES PATENTS

| Number | Name | Date |
|---|---|---|
| 268,986 | Bleisheim | Dec. 12, 1882 |
| 430,144 | Palmer | June 17, 1890 |
| 446,476 | Seymour | Feb. 17, 1891 |
| 650,827 | Davis et al. | June 5, 1900 |
| 2,338,301 | Robinson | Jan. 4, 1944 |
| 2,584,492 | Newton | Feb. 5, 1952 |